(12) United States Patent
McIsaac et al.

(10) Patent No.: US 6,290,483 B1
(45) Date of Patent: Sep. 18, 2001

(54) APPARATUS FOR FOOD EXTRUSION

(75) Inventors: John McIsaac, Dedham; Jim Brueggeman, Somerville, both of MA (US)

(73) Assignee: Robert Reiser & Co., Inc., Canton, MA (US)

( * ) Notice: Subject to any disclaimer, the term of this patent is extended or adjusted under 35 U.S.C. 154(b) by 0 days.

(21) Appl. No.: 09/501,076

(22) Filed: Feb. 9, 2000

Related U.S. Application Data

(60) Provisional application No. 60/157,938, filed on Oct. 6, 1999.

(51) Int. Cl.[7] ................................................ A23L 1/317
(52) U.S. Cl. .................. 425/192 R; 425/382 R; 425/464; 426/513; 426/516
(58) Field of Search ............................. 425/192 R, 192 S, 425/382 R, 464; 426/92, 516, 646, 513

(56) References Cited

U.S. PATENT DOCUMENTS

| | | | |
|---|---|---|---|
| 2,673,368 * | 3/1954 | Denyes ................................. 425/464 |
| 2,703,433 * | 3/1955 | Holzmann ............................ 425/464 |
| 3,433,857 * | 3/1969 | Dutton et al. ........................ 425/464 |
| 3,645,748 | 2/1972 | Ilines . |
| 3,903,315 * | 9/1975 | Giles et al. ........................... 426/516 |
| 3,934,827 | 1/1976 | Seydelmann ........................... 241/84 |
| 4,004,742 | 1/1977 | Hess ..................................... 241/82.5 |
| 4,036,442 | 7/1977 | Barnes ................................. 241/82.5 |
| 4,057,379 | 11/1977 | Sato ..................................... 425/199 |
| 4,358,061 | 11/1982 | Richter ................................ 241/82.4 |
| 4,391,575 * | 7/1983 | Osrow .................................. 425/464 |
| 4,438,146 | 3/1984 | Colby et al. ......................... 426/448 |
| 4,541,143 | 9/1985 | Holly . |
| 4,597,135 | 7/1986 | Holly et al. . |
| 4,630,533 | 12/1986 | Schaef t al. . |
| 4,645,444 | 2/1987 | Lenk et al. .......................... 425/192 |
| 4,699,325 | 10/1987 | Hess ..................................... 241/82.5 |
| 4,731,006 | 3/1988 | Freda et al. ......................... 425/190 |
| 4,800,094 | 1/1989 | Freda et al. ......................... 426/513 |
| 4,801,097 | 1/1989 | Fitch, Jr. ............................... 241/34 |
| 4,928,892 | 5/1990 | Huebner et al. .................... 241/82.5 |
| 4,937,089 * | 6/1990 | Ikoma et al. ........................ 426/516 |
| 4,978,077 | 12/1990 | Huebner et al. ...................... 241/30 |
| 5,205,206 | 4/1993 | Kitama et al. . |
| 5,240,400 | 8/1993 | Fujimoto et al. ................... 425/310 |
| 5,404,796 | 4/1995 | Campbell et al. . |
| 5,449,459 | 9/1995 | Glaser et al. . |
| 5,537,915 | 7/1996 | Kelly .................................... 99/336 |
| 5,538,748 | 7/1996 | Boatman et al. .................... 426/516 |
| 5,565,234 | 10/1996 | Teraguchi et al. .................. 426/634 |
| 5,567,463 | 10/1996 | Schaaf ................................. 426/523 |
| 5,665,419 | 9/1997 | Teraguchi et al. .................. 426/656 |
| 5,685,218 | 11/1997 | Kemper . |
| 5,762,971 | 6/1998 | Schirmer ............................. 425/133.1 |
| 5,800,854 | 9/1998 | Jaeger .................................. 426/516 |
| 5,820,892 | 10/1998 | Lauer et al. ......................... 425/151 |

* cited by examiner

*Primary Examiner*—Nam Nguyen
*Assistant Examiner*—Joseph Leyson
(74) *Attorney, Agent, or Firm*—Foley, Hoag & Eliot LLP

(57) ABSTRACT

An apparatus for food extrusion is provided. The apparatus includes a substantially circular plate having a plurality of holes in an offsetting arrangement thereon. The arrangement of the holes provide food extruded through the apparatus with a shape which approximates the arrangement.

15 Claims, 5 Drawing Sheets

APPARATUS FOR FOOD EXTRUSION

RELATED U.S. APPLICATION(S)

The present application claims priority to U.S. Provisional Patent Application Ser. 60/157,938, filed Oct. 6, 1999, which is hereby incorporated herein by reference.

TECHNICAL FIELD

The present invention relates generally to forming plates for use in connection with food extrusion, and more particularly, to forming plates for use in providing food extrusion with a defined extrusion shape.

BACKGROUND ART

At the present, forming plates used in connection with food extrusion, for example, meat extrusion, are manufactured with holes in a series of straight lines, as shown in FIG. 1, with the holes in each line offset from the holes in the lines adjacent thereto. The formation of holes in offsetting straight lines across the plate permits the manufacturing of such holes, for example, on the Computer Numerically Controlled (CNC) drill press, with relative ease. In addition, formation of holes in an offsetting manner avoids the presence of substantially large ligaments (i.e., spacing between holes of adjacent lines), which ligaments are often observed when the holes between adjacent lines are not offset, but are rather linearly aligned. The presence of substantially large ligaments on the surface of the forming plate can lead to an extrusion that may not be tightly pact or sufficiently firm for packaging.

Despite the offsetting pattern of holes, many forming plates are designed with holes in a pattern which usually lead to the formation of rectangularly shaped food extrusion. In addition to the rectangularly shape extrusion, because the length of each line formed by the holes may not be similar, as seen with presently available forming plates, the resulting extrusion can be wave-like in character. Such shape and character, when present in the extrusion, may make it difficult to fit the extrusion into most trays or containers presently used for packaging. Furthermore, it has been noted that consumers often find such shape and character to be undesirable. Instead, consumers have shown preference for extrusions with a fuller, more rounded profile.

To avoid formation of rectangularly or wave-like shaped extrusions, various design changes have been attempted, for example, varying the placement of the holes on the forming plates. Another example includes varying the length of each line by, for example, adding the number of holes therein, as seen in FIG. 1. Despite this variation in the length of certain lines, the extrusion still tend to be flat, and a fuller, more rounded profile may not be achieved.

Accordingly, it is desirable to provide forming plates which can provide food extrusions with a fuller, more rounded profile, so as to appeal to consumers, while being tightly pact, such that the extrusion can be easily packaged into presently available trays or containers.

SUMMARY OF INVENTION

The present invention, in accordance with one embodiment, provides a forming plate for use in food extrusion, including meat extrusion. The plate is substantially circular in shape and includes a plurality of holes formed thereon. The holes, in one embodiment, are arranged in successive arcs beginning at an area adjacent the perimeter of the plate and moving inward towards the center of the plate. The holes in each successive arc are preferably offset from the holes in the adjacent arcs, so as to minimize spacing between holes of adjacent arcs. By minimizing the spacing between the holes, each strand of food stuff extruded through a hole may be permitted to closely engage adjacent extrusion strands, so as to provide a firm and generally tightly packed extrusion. The pattern of offsetting successive arcs may continue toward the center of the plate until the area within which the arcs are placed can no longer support such an offsetting arrangement. In one embodiment, at least two offsetting successive arcs the are provided towards the perimeter of the plate. When the successive arc arrangement towards the center of the plate can no longer be supported, the holes may be arranged in offsetting straight lines.

In an alternate embodiment, the holes may be arranged in a concentric circular arrangement from the perimeter of the plate towards the center of the plate, with the holes in each circular arrangement being offset from the holes in the adjacent circular arrangement. This pattern may continue toward the center of the plate until such area on the plate can no longer support an offsetting circular arrangement. At such point, the holes may be arranged in offsetting straight lines.

A forming plate having the above described offsetting patterns of holes can provide food extruded therethrough with a correspondingly desired shape, for example, a curved or more rounded profile with the successive arc arrangement, or a tubular shape with the concentric circular arrangement. In general, as food stuff is being advanced across the forming plate, the resulting extrusion can be portioned into loaves for packaging in commonly used trays or containers.

BRIEF DESCRIPTION OF THE DRAWINGS

The present invention will become apparent to one skilled in the art by reading the following specification and appended claims and by referencing the following drawings in which:

DETAILED DESCRIPTION OF SPECIFIC EMBODIMENTS

Figure 1:
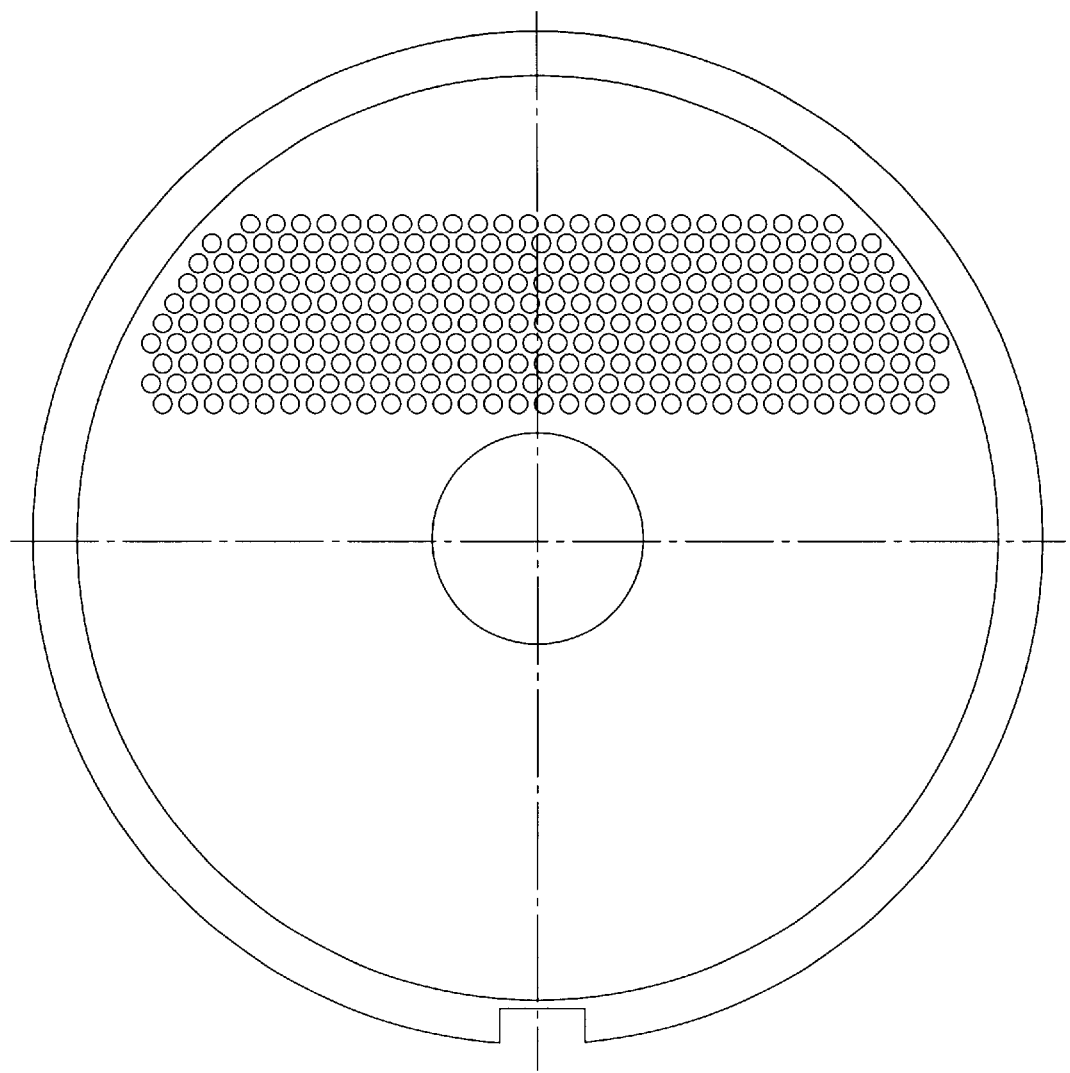
FIG. 1 illustrates a prior art forming plate.
Figure 2:
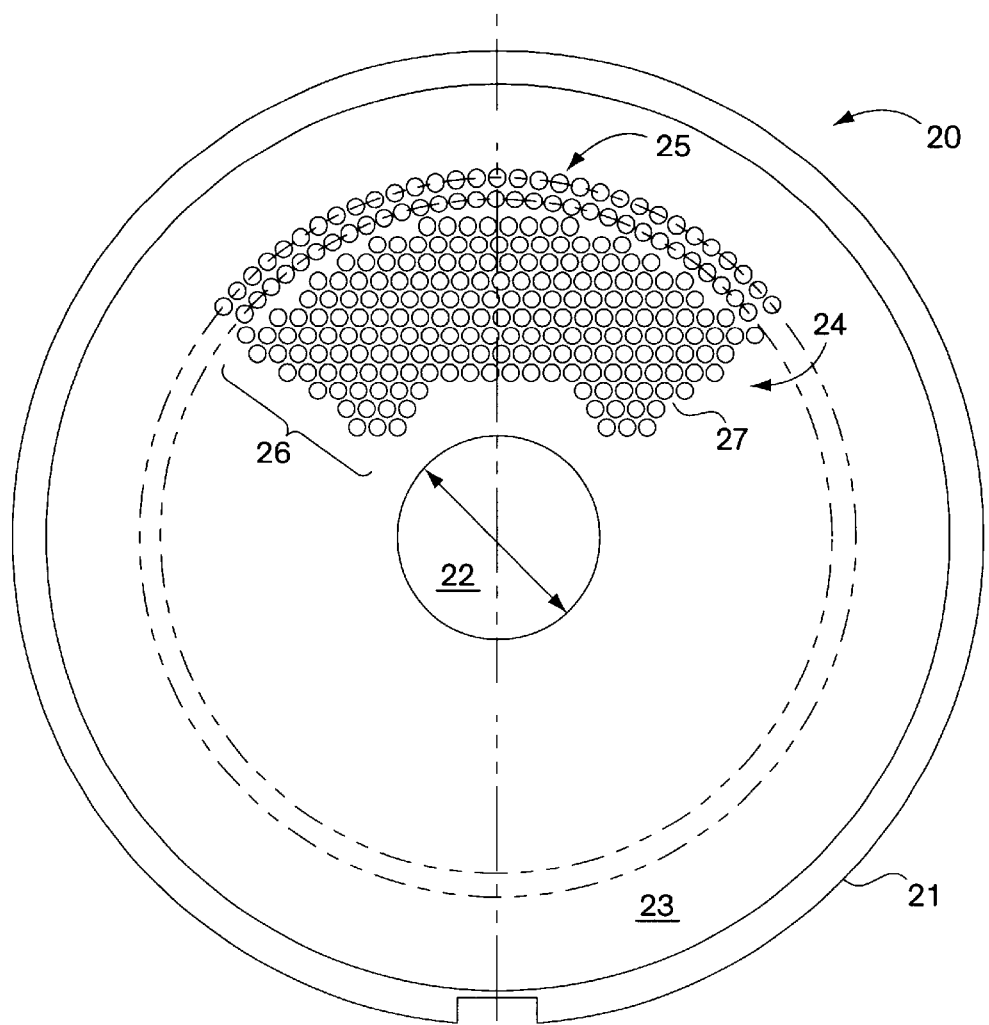
FIG. 2 illustrates one embodiment of a forming plate of the present invention.

With reference now to the drawings, in FIG. 2, there is shown a forming plate 20 for providing food extrusion in accordance with one embodiment of the present invention. The plate 20 includes a perimeter 21, a central bore 22 for connection to an apparatus or machine for processing and extruding food stuff (see FIG. 4), an extrusion surface 23, and a plurality of holes 24 arranged in a pattern on the extrusion surface 23. In one embodiment, the holes 24 are arranged in a pattern of successive arcs 25 beginning at an area adjacent the perimeter 21 and moving inward towards the central bore 22. The holes 24 in each successive arc 25 are preferably offset from the holes 24 in the adjacent arc 25. By positioning the holes 24 in an offsetting manner, the size of ligaments 27 (i.e., spacing between adjacent holes 24) may be minimized between holes 24 of adjacent arcs 25. It should be appreciated that in minimizing the size of the ligaments 27, each strand of food stuff extruded through a hole 24 may be permitted to closely engage adjacent extruded strands, so as to provide a firm and generally tightly packed extrusion. In particular, when no longer under the constant pressure within the apparatus for processing food stuff, as a strand of food stuff exits through the holes 24, such strand may expand in size to firmly engage an adjacent strand of food stuff exiting from an adjacent hole 24 closely positioned thereto. While the minimization of the size of the ligament 27 is desirable in order to obtain a tightly and firmly packed extrusion, it should be noted that the size of the ligament 27 should be sufficient to withstand pressure being exerted by the extruded food stuff without breaking. In this manner, it is preferable that the forming plate 20 be made from a strong and rigid material, for example, stainless steel or molded plastic.

Still referring to FIG. 2, the pattern of offsetting successive arcs 25 may continue toward the central bore 22 until the area within which the offsetting successive arcs 25 is to be placed can no longer support such an offsetting arrangement 25, for instance, due to the decreasing diameter of the remaining area on the surface 23. In one embodiment, at least two offsetting successive arcs 25 are provided closest to the perimeter 21. The remaining holes 24, on the other hand, may be arranged in a series of straight lines 26, with holes 24 on each line 26 being offset from holes 24 in adjacent lines 26. As shown in FIG. 2, the length of each line 26 may be varied by the addition or removal of holes 24 in each line 26, such that overall the series of successive lines 26 approximate an arc. It should be appreciated that eventhough the majority of the holes 24 may be in a series of straight lines 26, the presence of the successive arcs 25 closest to the perimeter 21, and the approximation of the successive lines 26 to that of an arc will provide the extrusion with a curved, or more rounded profile. Furthermore, should it be necessary to increase or decrease the size of the food extrusion, additional arcs 25 and/or holes 24 approximating an arc may be added on the extrusion surface 23 toward the perimeter 21 or removed from the extrusion surface 23 toward the central bore 22.

As it is desirable to provide the food extrusion with a consistent firmness throughout, holes 24 may be similarly sized and may be evenly spaced in their arrangement. In this manner, the strands of extruded food stuff, when no longer under the pressure within the food processing apparatus, may expand and evenly and firmly engage adjacent strands of food stuff to enhance the firmness and consistency of the extrusion. This firmness permits the extrusion to maintain its curved or more rounded profile, and to be easily portioned for packaging in commonly used trays or containers.

Figure 3:
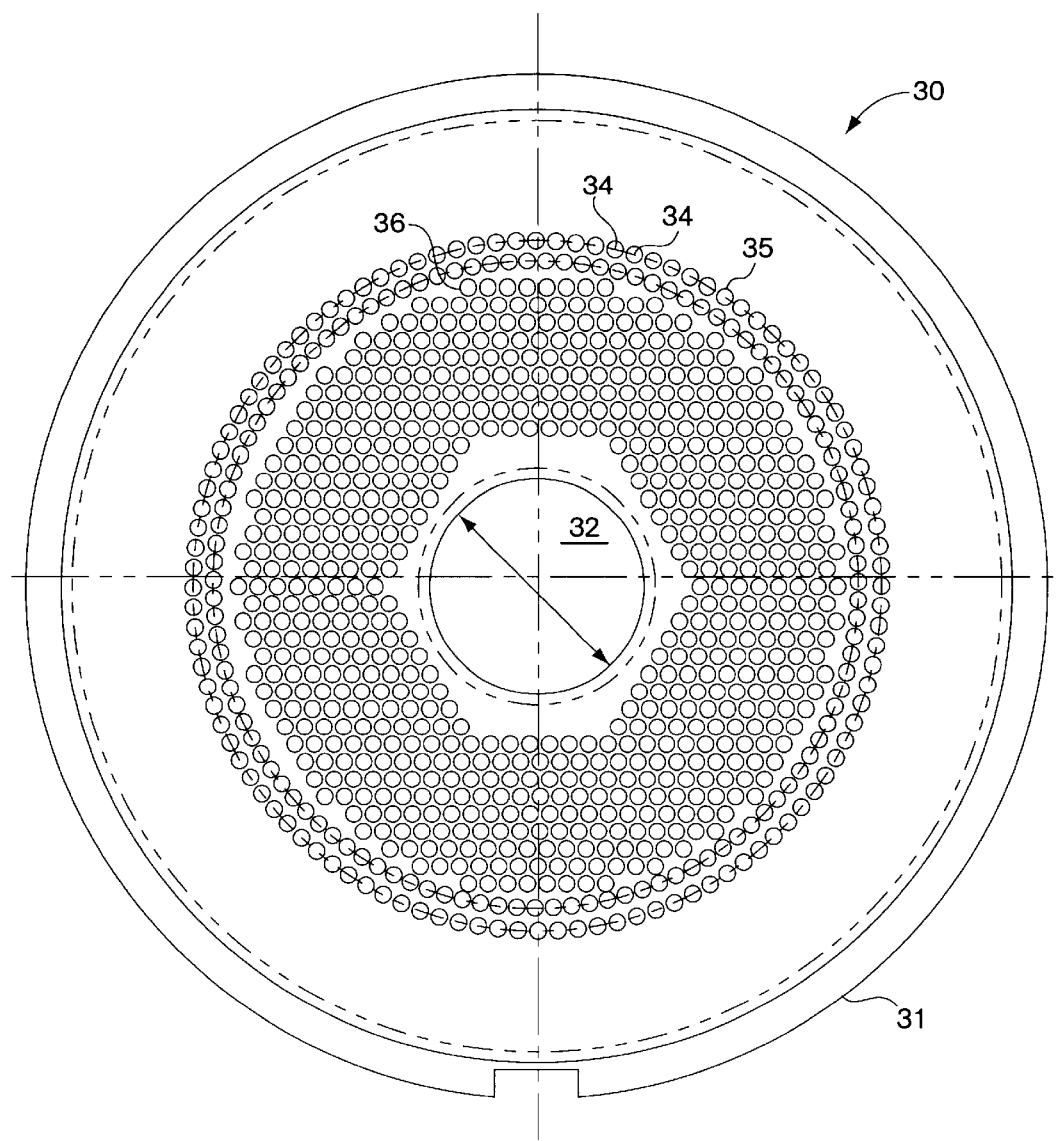
FIG. 3 illustrates another embodiment of a forming plate of the present invention.

In FIG. 3, there is shown a forming plate 30, in accordance with another embodiment of the present invention. In plate 30, instead of arranging the holes in successive arcs, holes 34 are in a concentric circular arrangement 35 beginning at an area adjacent perimeter 31 and moving inward towards central bore 32. The holes 34 in each circular arrangement 35 are preferably offset from the holes 34 in the adjacent circular arrangement 35. This pattern of offsetting circular arrangement 35 may continue toward the central bore 32 until the area within which the circular arrangement 35 is to be placed can no longer support such an offsetting arrangement 35. In one embodiment, at least two offsetting circular arrangements 35 are provided toward the perimeter 31. When the circular arrangement 35 toward the central bore 32 can no longer be supported due to the constraint of space on the plate 30, the plate 30 may be provided with a linear arrangement of holes 34 in offsetting straight lines 36. The length of each line 36 may be varied by the addition or removal of holes 34 in each line 36, such that the series of successive lines 36 approximate a circular arrangement.

Figure 4:
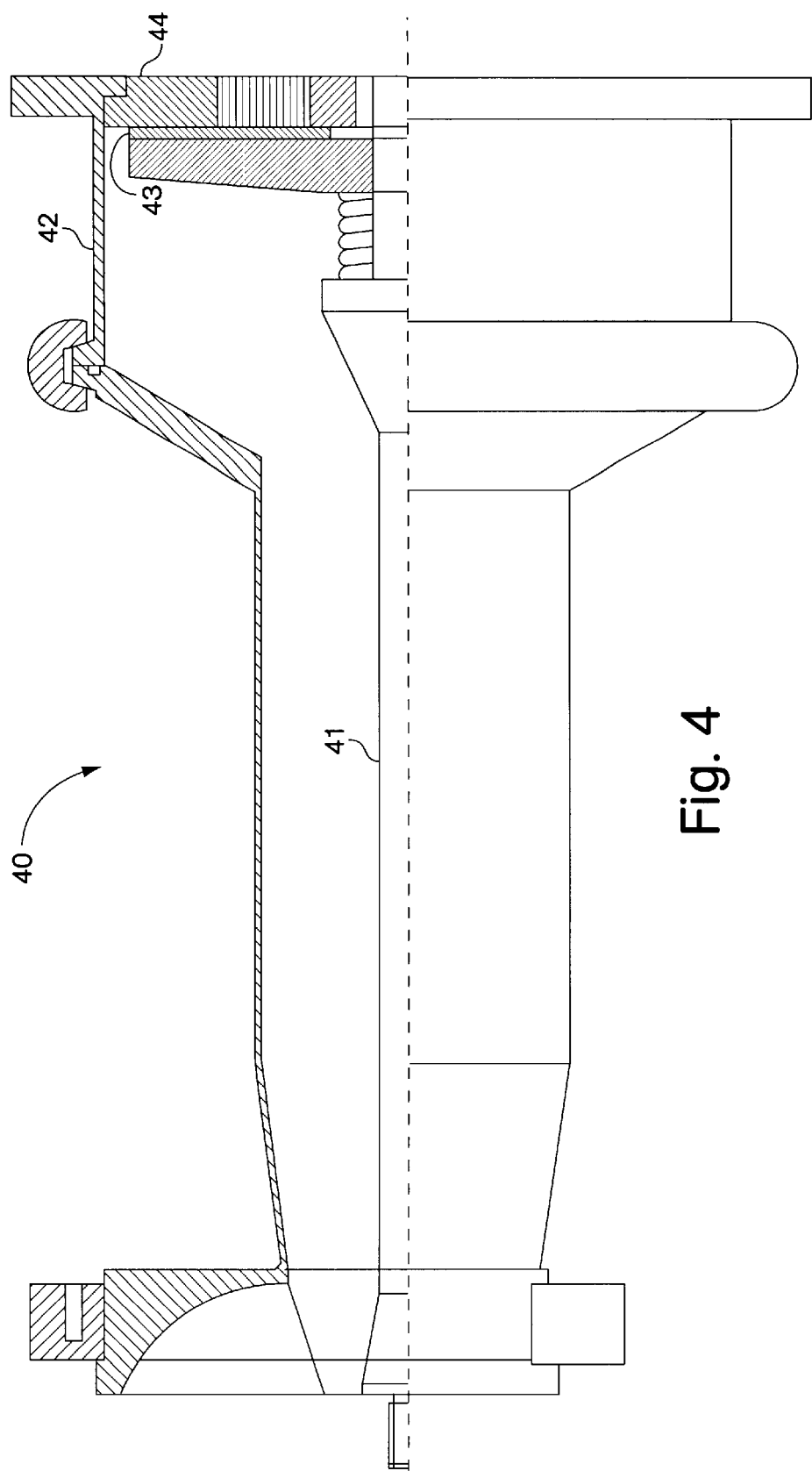
FIG. 4 illustrates a extrusion system which may be used with the forming plate of the present invention.

Looking now at FIG. 4, the forming plate of the present invention, such as that shown in FIG. 2 or 3, may be used with an apparatus or machine 40, for instance, a commercially available food extruder, such as the CS-200 from Robert Reiser & Co. (Canton, Ma.), to extrude food stuff in accordance with an embodiment of the present invention. The machine 40 may include a shaft 41, a housing 42, a wiping blade 43, and an extrusion area 44, to which, for instance, the forming plate 20 of the present invention may be secured. To extrude food stuff in accordance with a method of the present invention, food stuff, may be placed in the machine 40 downstream from the forming plate 20. The food stuff is pressurized to move along the shaft 41 toward the plate 20. Once the food stuff exits the shaft 41, it enters into the housing 42 in preparation for extrusion through the forming plate 20. As a predetermined amount of extruded food stuff exits through the forming plate 20, the wiping blade 43 may be actuated occasionally to prevent blockage of the holes 24 by the food stuff. It should be appreciated that since the food stuff is under constant pressure within the machine 40, despite actuation of the wiping blade 43 which may temporarily sever the extrusion within the housing, the pressure will permit the food stuff to rejoin the exiting extrusion and flow from the machine 40 in one continuous stream. In one embodiment, the stream of extrusion may be carried from the machine 40 by a conveyor belt (not shown) to a point downstream of the machine 40, at which point the extrusion is portioned into loaves by a portioning knife (not shown). The cut loaves, in the curved or more rounded shape corresponding to the pattern of the holes 24 on the forming plate 20, may subsequently be placed into trays or containers and packaged. As the forming plate 20 may come into contact with the wiping blade 43, the forming plate 20, in one embodiment, is provided with an extrusion surface 23 which permits the wiping blade 43 to smoothly move across the surface 23.

Figure 5:
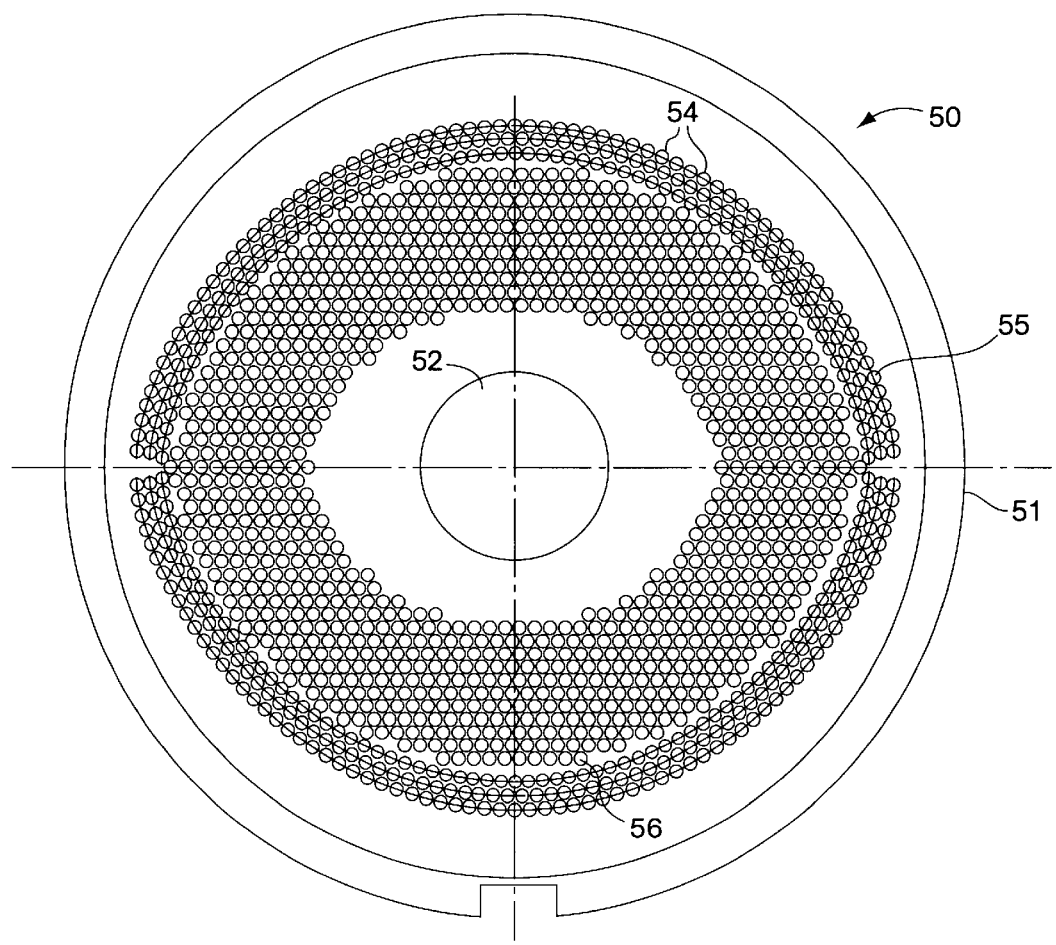
FIG. 5 illustrates another embodiment of a forming plate of the present invention.

While the invention has been described in connection with the specific embodiments thereof, it will be understood that it is capable of further modification. For example, should it be necessary to provide the food extrusion with a profile other than a circular or rounded profile, the pattern of holes on the extrusion surface of the forming plate may be redesigned to approximate the desired profile or geometric pattern. For instance, as shown in FIG. 5, forming plate 50 may be provided with a pattern of holes 54 which approximate an ellipse. In the embodiment shown in FIG. 5, holes 54 are in a successive elliptical arrangement 55 beginning at an area adjacent perimeter 51 and moving inward towards central bore 52. Between the successive elliptical arrangement 55 and the central bore 52, holes 54 may be in a linear arrangement of offsetting straight lines 56. The length of each line 56 may be varied by the addition or removal of holes 54 in each line 56, such that the series of successive lines 56 approximate an ellipse.

The shape of the forming plate itself may embody different shapes to accommodate different extruding apparatuses. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. An apparatus for providing food extrusion with a defined shape, the apparatus comprising:
   an extrusion surface defined by a substantially circular perimeter;
   a central bore positioned on the surface to permit attachment of the apparatus to a food extrusion machine; and
   a plurality of holes arranged in a pattern approximating a series of successive arcs between the perimeter and the central bore;
   a plurality of holes in a series of straight lines between the successive arcs and the central bore; and
   wherein the holes are positioned sufficiently close to one another so as to permit formation of a firm, tightly packed food extrusion.

2. An apparatus as set forth in claim 1, wherein the holes in each of the arcs are offset from the holes in an adjacent arc.

3. An apparatus as set forth in claim 1, wherein the holes in each of the lines are offset from the holes in an adjacent lines.

4. An apparatus as set forth in claim 1, wherein the series of straight lines between the successive arcs and the central bore approximate an arc.

5. An apparatus as set forth in claim 1, wherein the holes are positioned sufficiently close to one another so as to permit formation of a food extrusion which includes a curved or substantially rounded profile.

6. An apparatus for providing food extrusion with a defined shape, the apparatus comprising:
   an extrusion surface defined by a substantially circular perimeter;
   a central bore positioned on the surface to permit attachment of the apparatus to a food extrusion machine;
   a plurality of holes in a series of concentric circular arrangements between the perimeter and the central bore;
   a plurality of holes in a series of straight lines between the concentric circular arrangements and the central bore; and
   wherein the holes are positioned sufficiently close to one another so as to permit formation of a firm, tightly packed food extrusion.

7. An apparatus as set forth in claim 6, wherein the holes in each of the concentric circular arrangements are offset from the holes in each of their respective adjacent arrangements.

8. An apparatus as set forth in claim 6, wherein the holes in each of the lines are offset from the holes in an adjacent line.

9. An apparatus as set forth in claim 6, wherein the series of straight lines between the concentric circles and the central bore approximate a circular arrangement.

10. An apparatus as set forth in claim 9, wherein the holes are positioned sufficiently close to one another so as to permit formation of a food extrusion which includes a tubular profile.

11. An apparatus for providing food extrusion with a defined shape, the apparatus comprising:
    an extrusion surface defined by a substantially circular perimeter;
    a central bore positioned on the surface to permit attachment of the apparatus to a food extrusion machine;
    a plurality of holes arranged in a series of successive elliptical arrangements between the perimeter and the central bore;
    a plurality of holes in a series of straight lines between the successive elliptical arrangements and the central bore; and
    wherein the holes are positioned sufficiently close to one another so as to permit formation of a firm, tightly packed food extrusion.

12. An apparatus as set forth in claim 11, wherein the holes in each of the successive elliptical arrangements are offset from the holes in each of their respective adjacent arrangements.

13. An apparatus as set forth in claim 11, wherein the holes in each of the lines are offset from the holes in an adjacent line.

14. An apparatus as set forth in claim 11, wherein the series of straight lines between the successive elliptical arrangements and the central bore approximate an elliptical arrangement.

15. An apparatus as set forth in claim 14, wherein the holes are positioned sufficiently close to one another so as to permit formation of a food extrusion which includes an elliptical profile.

* * * * *